United States Patent Office 3,639,500
Patented Feb. 1, 1972

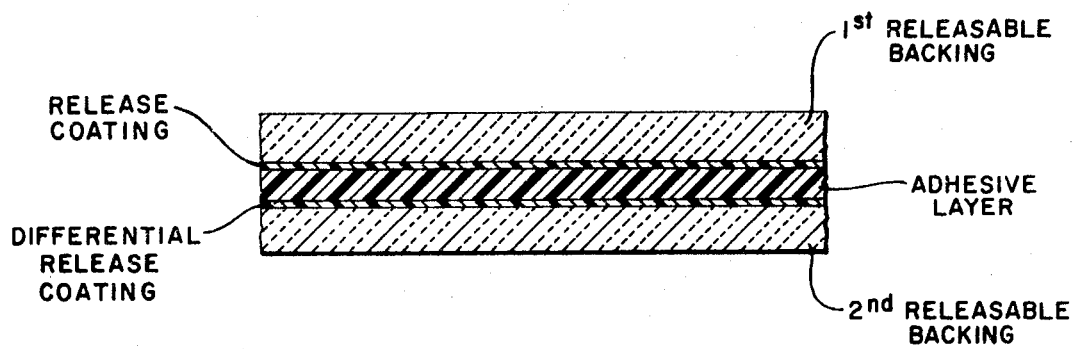
INVENTORS
RICHARD P. MUNY
DAVID W. WILSON
BY
McKenny, Farrington, Pearne & Gordon
ATTORNEYS

3,639,500
CURABLE PRESSURE SENSITIVE ADHESIVE CONTAINING A POLYEPOXIDE, A CARBOXYLATED DIENE POLYMER AND AN ACRYLIC ESTER TACKIFIER
Richard P. Muny, Painesville, and David W. Wilson, Mentor, Ohio, assignors to Avery Products Corporation
Filed May 9, 1968, Ser. No. 727,780
Int. Cl. C08g 45/04
U.S. Cl. 260—837                      25 Claims

ABSTRACT OF THE DISCLOSURE

There is provided an adhesive composition which is initially pressure-sensitive and which is characterized by the presence therein of an elastomer containing highly polar groups, for example those known to open or associate with the reactive portion of resins capable of forming a structural bond, e.g. a "carboxylated rubber"; an epoxy resin; a reactive tackifier; and a latent curing agent which is substantially nonreactive at temperatures below about 75° C., but becomes effective to promote interaction of components of the adhesive composition at temperatures above about 140° C. to provide a strong structural adhesive.

---

This invention relates as indicated to an improved thermally convertible pressure-sensitive adhesive composition in which the ingredients of the adhesive composition are mutually interreactive at elevated temperatures and become converted to a structural adhesive capable of very high bond strengths. This invention also contemplates the provision of an adhesive film disposed between backing members, preferably backing members which are differentially releasable from the adhesive. The invention also contemplates a method of temporarily and permanently adhering together similar or dissimilar confronting surfaces.

With technological improvement in adhesives, there has been growth in their use in the fabrication of various articles of manufacture, for example watercraft, household appliances, etc. They have to an extent replaced or supplemented conventional mechanical fastening means as a means of fastening parts together. Expanding applications invariably introduced needs and problems of their own, and in this particular instance, it has been desired to find a suitable composition which exhibits pressure-sensitive adhesive characteristics useful during assembly which material may then be converted by subsequent treatment to a structural adhesive.

To the achievement of this purpose, it has now been found that an adhesive composition of a film-forming carboxylated elastomeric diene polymer, a normally liquid thermosetting polyhydric phenol polyether alcohol, a reactive resinous or polymeric tackifier, and a latent curing agent is initially pressure-sensitive, and can be converted by means of heat to a structural adhesive having bond strengths as tested by standard A.S.T.M. procedures in excess of 1500 lbs. per square inch tensile lap shear. The adhesive can be provided in the uncured state as a film supported between differentially releasable backing sheets.

In use, the adhesive is conveniently applied between confronting surfaces of the same or different materials to be adhered together, for example aluminum to aluminum, or aluminum to rubber, to form a laminate. Sufficiently firm contact or light pressure is established between the composite surface-adhesive-surface structure to "set" the composite with enough adhesion to permit handling. Thereafter, heat is applied to the composite structure, or at least the adhesive interface thereof, to convert the intermediate adhesive layer to a structural adhesive coacting between the two confronting surfaces. Adhesive compositions formed from the epoxy-reactive elastomers and epoxy resins and including a latent curing agent have been disclosed in U.S. Pat. 3,312,754. The present invention is distinguished from and represents an improved alternative with respect to the subject matter of the aforesaid patent in that a reactive resinous tackifier is included in the adhesive composition. This provides an adhesive composition which is initially pressure-sensitive. After the imposition of thermal conditions has activated the latent curing agent and rendered the tackifier active, interaction of the several components of the adhesive occurs in such a way that such components ultimately contribute to the formation of a structural adhesive of remarkably great strength. The utilization of a reactive tackifier having a thermal threshold of activity in the presence of a system wherein interreaction of one or more other components and a curing agent is retarded or suppressed at ordinary temperatures is believed to be entirely novel and productive of an exceedingly useful adhesive composition.

The annexed drawing shows a cross-section through a composite tape including differentially releasible backing sheets and an intermediate adhesive layer. It will be understood, of course, that the adhesive compositions of the present invention may be embodied in a wide variety of articles, and that the interposition of a film of the adhesive between releasible sheets is but one form in which the compositions of this invention may be used. For example, one of the sheets need not be releasable, but may contain a decorative surface, intelligence as in the case of a sign, or warning devices such as reflex reflective beads adhered thereto to provide articles useful in the fabrication of decorated surfaces, signs, warning devices, and the like.

It becomes convenient at this point to describe in detail the essential components of the adhesives of the present invention, and to give specific examples of adhesives embodying the principles hereof.

THE FILM-FORMING INGREDIENTS

One essential component of the compositions of this invention is a film-forming carboxylated elastomeric diene polymer, preferably a terpolymer. The materials are prepared by known procedures from an open-chain aliphatic conjugated diene containing from 4 to 9 carbon atoms, an olefinically-unsaturated carboxylic acid, and desirably although not essentially an interpolymerizable monoolefinic material. Polymers useful herein are disclosed in U.S. Pat. 2,724,707, the disclosure of which is incorporated herein by reference thereto. The polymers as they are used in this invention are in the uncrosslinked state; that is, they contain no metal as a result of the interaction of a metal oxide such as zinc oxide with the carboxyl-containing polymer. The film-forming polymers contain from 0.001 to 0.30 chemical equivalents of combined carboxyl (—COOH) per 100 parts by weight of polymer and are preferably metal-free except for trace metals introduced by catalysts or as impurities in the ingredients.

Other film-forming polymers useful herein include the polyamides formed from dibasic aliphatic carboxylic acids and aliphatic diamines e.g. ethylene with the amine in molar excess to provide free amino content in the range above-stated. Amine values in the range of 215–375 are contemplated.

The polymerization is generally carried out as an emulsion polymerization procedure in an acidic aqueous medium comprising, as essential ingredients, at least 50% by weight of an open-chain, aliphatic conjugated diene, such as butadiene-1,3, and equal or lesser amounts of one or more of the olefinically-unsaturated carboxylic acids.

Other monomeric materials are not essentially present in the monomer mixture but may be present if desired.

The open-chain aliphatic conjugated dienes suitable for use in preparing the monomeric pre-polymerization mixture include the 1,3-diene hydrocarbons such as butadiene-1,3, itself, 2-methyl butadiene-1,3 (isoprene), 2,3-dimethyl butadiene-1,3, piperylene, 2-neopentyl butadiene-1,3, and other hydrocarbon homologs of butadiene-1,3, in addition to the substituted butadienes such as 2-chloro butadiene-1,3, 2-cyano butadiene-1,3, the straight-chain conjugated pentadienes, and the straight- and branched-chain conjugated hexadienes and others. The butadiene-1,3 hydrocarbons and butadiene-1,3 in particular, are presently much preferred because of their ability to produce stronger and more desirable polymers than other open-chain aliphatic conjugated dienes presently known.

The olefinically-unsaturated carboxylic acids which are polymerized with the aforementioned open-chain, aliphatic diene or a mixture of dienes are characterized by possessing one or more olefinic double bonds between carbon atoms, and one or more carboxyl groups. Thus, useful materials include monocarboxy and polycarboxy, monoolefinic and polyolefinic acids such as acrylic acid, the alpha-alkyl acrylic acids, e.g. methacrylic acid; crotonic acid, beta-acryloxy propionic acid, alpha- and beta-vinyl acrylic acid, cinnamic acid, maleic acid, oleic acid, undecylenic acid, ricinoleic acid, linoleic acid, linolenic acid and others. Best results are obtained by the utilization of one or more olefinically unsaturated carboxylic acids containing at least one activated olefinic carbon-2-carbon double bond which double bond is present in the monomer molecule either in the alpha-beta position with respect to the carboxyl group or attached to a terminal methylene group. The useful carboxylic acids contain from 3 to 18 carbon atoms; the preferred unsaturated acids contain from 3 to 9 carbon atoms.

Illustrative alpha-beta unsaturated carboxylic acids include maleic, fumaric, crotonic, alpha-butyl crotonic acid, angelic acid, hydrosorbic acid, and various alkyl or halogen-substituted sorbic acids, cinnamic acids, and various halogen or alkyl-substituted cinnamic acids, acrylic acid and various substitution products either alkyl or halogen-substituted acrylic acids including for example alpha-chloro acrylic acid, methacrylic acid, ethacrylic acid, alpha-isopropylidene acrylic acid, alpha-styryl acrylic acid, beta-vinyl acrylic acid, alpha-vinyl acrylic acid, beta-acryloxy propionic acid, beta-acryloxy acetic acid, etc.

In addition to the aforementioned two essential types of monomers, that is the conjugated diene and the olefinically-unsaturated acid, the monomer mixture to be polymerized may also desirably contain one or more interpolymerizable monoolefinic monomeric materials containing from 3 to 14 carbon atoms, and preferably from 3 to 6 carbon atoms. Specific examples of such materials include acrylonitrile, alpha-chloro acrylonitrile, the alkyl esters of acrylic and alpha-alkyl acrylic acids such as methyl acrylate, ethyl acrylate, butyl acrylate, 2-ethyl hexyl acrylate, t-octyl acrylate, methyl methacrylate, ethyl methacrylate, methyl ethacrylate, butyl methacrylate, lauryl methacrylate, etc., styrene, vinylidene chloride, vinyl pyridene, isobutylene, etc. Such additional monomeric materials are considered to be a replacement in part for either the conjugated diene or the olefinically-unsaturated acid.

The preferred polymers of the present invention are tripolymers and other multipolymers having from 50% to 94% by weight of the conjugated diene (preferably a butadiene-1,3 hydrocarbon), from 1% to 50% by weight of the unsaturated carboxylic acid (preferably methacrylic acid) and from 5% to 40% by weight of one or more than one of the monoolefinic monomers (preferably acrylonitrile), and having from 0.001 to 0.30 chemical equivalents of combined carboxyl (—COOH) per 100 parts by weight of polymer.

A typical procedure for preparing the copolymers, and the presently preferred tripolymers useful in accordance with this invention is disclosed in Example 1 in the aforesaid Pat. No. 2,724,707.

Particularly useful examples of monomer mixtures yielding polymers useful in accordance herewith as the film-forming epoxy-reactive elastomer are the following:

(1)

| | Percent by wt. |
|---|---|
| Butadiene-1,3 | 90 |
| Acrylonitrile | 5 |
| Methacrylic acid | 5 |

(2)

| | Percent by wt. |
|---|---|
| Butadiene-1,3 | 88.1 |
| Acrylonitrile | 5.3 |
| Methacrylic acid | 8.6 |

(3)

| | Percent by wt. |
|---|---|
| Butadiene-1,3 | 70 |
| Acrylonitrile | 20 |
| Methacrylic acid | 10 |

(4)

| | Percent by wt. |
|---|---|
| Butadiene-1,3 | 67 |
| Acrylonitrile | 24.4 |
| Methacrylic acid | 8.6 |

(5)

| | Percent by wt. |
|---|---|
| Butadiene-1,3 | 60 |
| Acrylonitrile | 25 |
| Methacrylic acid | 15 |

(6)

| | Percent by wt. |
|---|---|
| Butadiene-1,3 | 55 |
| Acrylonitrile | 35 |
| Methacrylic acid | 10 |

(7)

| | Percent by wt. |
|---|---|
| Butadiene-1,3 | 95 |
| Acrylic acid | 5 |

(8)

| | Percent by wt. |
|---|---|
| Butadiene-1,3 | 70 |
| Acrylonitrile | 27.5 |
| Methacrylic acid | 2.5 |

(9)

| | Percent by wt. |
|---|---|
| Butadiene-1,3 | 58 |
| Styrene | 19 |
| Methacrylic acid | 23 |

(9a)

| | Percent by wt. |
|---|---|
| Isoprene | 90 |
| Acrylonitrile | 5 |
| Methacrylic acid | 5 |

(9b)

| | Percent by wt. |
|---|---|
| Butadiene-1,3 | 70 |
| Acrylonitrile | 25 |
| Methacrylic acid | 5 |

THE EPOXY RESIN

Another essential component of the compositions hereof is an epoxy resin. The most useful class of such epoxy resins are those which are identified as thermosetting normally liquid polyglycidyl ether of a polyhydric phenol having an epoxide equivalent weight of from 175 to 300, and an average molecular weight of from about 300 to about 700. A preferred epoxy resin for use herein is formed from bisphenol-A [bis-(4-hydroxyphenyl) dimethylmethane] and epichlorohydrin, has an epoxide equivalent of 225 to 290 and an average molecular weight of about 450.

A typical process for the preparation of such epoxy resins is described in U.S. Pat. No. 2,500,449, the disclosure of which is incorporated herein by reference. Generally speaking, an epihalohydrin is reacted with a polyhydric material such as a polyhydric phenol, e.g. bis-phenol A, at 100° C. in the presence of sufficient alkali to neutralize the hydrogen halide formed during the reaction. Other epoxy resins and methods for their manufacture are described in U.S. Pats. 2,444,333; 2,528,932; 2,500,600; 2,467,171; 2,801,229; 2,735,829; 2,553,718; and 2,716,099; the disclosures of which are incorporated herein by reference.

Typical examples of epoxy resins useful in accordance herewith are as follows:

EXAMPLE 10

Bis-phenol A is dissolved in epichlorohydrin in the proportion of 5130 parts (2.5 mols) of bis-phenol A in 20,812 parts (225 mols) of epichlorohydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to cool the exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillataion of epichlorohydrin and water, but the temperature is not allowed to go below about 95° C. No cooling is necessary after the final addition of sodium hydroxide. After the last addition of sodium hydroxide with completion of the reaction the excess epichlorohydrin is removed by vacuum distillation with use of a kettle temperature up to 150° C. and a pressure of 50 mm. Hg. After completion of the distillation, the residue is cooled to about 90° C. and about 360 parts of benzene added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting glycidyl polyether of bis-phenol A has a Durrans' mercury method softening point of 10° C., an average molecular weight of 360 ebullioscopic measurement in ethylene dichloride, and an epoxide value of 0.538 epoxy equivalent per 100 grams. It has an epoxide equivalent weight of 186 and a 1,2-epoxy equivalency of 1.93.

EXAMPLE 11

A solution is prepared by dissolving 2,2-bis (4-hydroxyphenyl)-propane in slightly aqueous epichlorohydrin in the proportion of 5,130 parts (22.5 mols) of the dihydric phenol in 20,812 parts (225 mols) of epichlorohydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mole of bis-phenol A (2% excess) is added in installments. The first installment of 300 parts of sodium hydroxide is added and the mixture heated with efficient agitation. The heating is discontinued as the temperature reaches 80° C. and cooling is started in order to remove exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorohydrin and water, but the temperature is not allowed to go below about 95° C. No cooling is necessary after the final addition of sodium hydroxide. After the last addition of sodium hydroxide with completion of the reaction, the excess epichlorohydrin is removed by vacuum distillation with use of a kettle temperature up to 150° C. and a pressure of 55 mm. Hg. After completion of the distillation, the residue is cooled to about 90° C. and about 360 parts of benzene are added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting liquid glycidyl polyether of 2,2-bis (4-hydroxy-phenyl)-propane has the following properties:

| | |
|---|---|
| Durrans' melting point (° C.) | 9 |
| Molecular weight | 370 |
| Epoxide value (epoxide equivalents per 100 grams) | 0.50 |
| Epoxide equivalent weight | 200 |
| Hydroxyl value (hydroxyl equivalents per 100 grams) | 0.08 |
| Percent chlorine | 0.46 |

EXAMPLE 12

A solution consisting of 11.7 parts of water, 1.22 parts of sodium hydroxide, and 13.38 parts of bis-phenol A is prepared by heating the mixture of ingredients to 70° C. and then cooling to 46° C. at which temperature 14.06 parts of epichlorohydrin are added while agitating the mixture. After 25 minutes has elapsed, there is added during an additional 15 minutes' time a solution consisting of 5.62 parts of sodium hydroxide in 11.7 parts of water. This causes the temperature to rise to 63° C. Washing with water at 20 to 30° C. temperature is started 30 minutes later and continues for 4½ hours. The product is dried by heating to a final temperature of 140° C. in 80 minutes, and cooled rapidly. At room temperature, the product is an extremely viscous, semi-solid having a melting point of 27° C. by Durrans' mercury method and an epoxide equivalent weight of 249.

Additional examples of epoxy resins useful in accordance with this invention are those which are manufactured by reacting novolac resins with an epihalohydrin such as epichlorohydrin. The novolac resins are phenol-aldehyde resins, such as phenol-formaldehyde resin, prepared by reacting less than one mol of aldehyde per mol of phenol. Structurally, these resins resemble dihydroxy diphenyl methane, and their chains are phenol terminated. Epoxidized novolac resins are disclosed in U.S. Pats. 2,658,884; 2,658,885; and 2,716,099.

THE REACTIVE TACKIFYING RESIN

The third essential ingredient of the adhesives hereof is a resinous, polymeric material which at ordinary temperatures is capable of conferring tackiness upon the balance of the composition, is compatible with the balance of the composition, and possesses a threshold reactivity such that at ordinary temperatures, i.e. below about 165° F. (about 75° C.), this material is substantially nonreactive with the remaining components of the adhesive. However, at temperatures above about 175° C., this resin becomes chemically reactive with one or more of the remaining resinous ingredients of these compositions. It will be appreciated, of course, that these reactivities, like other reactivities, are time-temperature related, and generally, the higher the temperature, the more reactive the material becomes, and, conversely, the lower the temperature, the less reactive the material is. At ordinary temperatures, i.e. 25° C., the reactivity of the tackifier resins is so slight that shelf-lives of the order of 6 to 12 months are readily available with these compositions. Shelf-life of such duration is more than adequate for most purposes.

The tackifier resins of the present invention are reactive as distinguished from the rosin and polyterepene type resins normally used as tackifiers. These are not reactive in the sense of containing reactive groups chemically sensitive to other reactive groups in a given system. Accordingly, the nonreactive natural resins and the polymerized hydrocarbons, which have heretofore been utilized for their properties of conferring "tackiness" or "stickiness" upon a resinous system, are not within the scope of this invention.

On the contrary, the polymers useful as tackifiers in accordance with this invention are characterized by one or more species of the highly polar groups, e.g. carboxyl (—COOH), amide (—CONH$_2$), methylol (—CH$_2$OH), or nitrile (—CN). The tackifiers of the present invention are most conveniently, therefore, copolymers of materials whereby the resultant polymer is characterized by the presence therein of one or more of the foregoing group types in unreacted condition or in combination with a group of insulating radical which at temperatures above about 175° C. becomes detached from the reactive group or otherwise activated to permit reactivity with one or more of the other ingredients of the adhesive compositions hereof.

A highly satisfactory class of reactive tackifiers are those which are copolymers of an ester of a low molecular weight unsaturated aliphatic acid and a relatively small proportion, i.e. from 3% to 10% by weight, of an additive copolymerizable monomer having strongly polar groups such as an unsaturate low molecular weight acid, amide, or an unsaturated aliphatic nitrile. Accordingly, the $C_1$–$C_{12}$ alkanol esters of low molecular weight $C_3$–$C_5$ olefinic acids or equivalent, such as acrylic acid, methacrylic acid, crotonic acid, provide the monomer which is used in major amount in preparing the reactive tackifier resins of the present invention. The monomer used in minor amount to provide the strongly polar groups in the molecule may be selected from acrylic acid, methacrylic acid, acrylamide, methacrylamide, ethacrylic acid, ethacrylamide, itaconic acid, or a $C_3$–$C_5$ unsaturated nitrile, acrylonitrile, methacrylonitrile, or mixtures thereof.

Another highly satisfactory class of reactive tackifiers are phenol-aldehyde condensation products of the resole type. These may be used alone or in combination with the acrylate types.

The following specific examples illustrate the procedure for producing suitable reactive tackifiers in accordance herewith:

EXAMPLE 13

285 parts by weight of isoamyl acrylate monomer are copolymerized with 15 parts of acrylic acid in solution in 700 parts of ethyl acetate solvent, using 2 parts of benzoyl peroxide as a catalyst. The solution is held at 60° C. for 5 hours until polymerization is largely completed then at about 70° C. for 1 hour, to provide a viscous solution containing about 30% non-volatiles.

EXAMPLE 14

The acrylate ester of commercial fusel oil is copolymerized with acrylic acid in 95:5 ratio, by the method described under Example 13.

Commercial fusel oil has a variable composition lying within the approximate limits of 55–80% primary amyl alcohols, 15–45% primary butyl alcohols, and 0–5% n-propyl alcohol, as determined by analysis, and the fusel oil acrylate ester as used in this example is a mixture of the acrylic acid esters of these alcohols within the proportions given and having an average of slightly more than four carbon atoms per alcohol alkyl group. At least one-half of the carbon atoms of the alkyl groups of the ester molecules are in a straight chain terminating at the hydroxyl oxygen atom, a major proportion of such chains containing at least four carbon atoms.

The polymer of fusel oil acrylate, as well as other polymers and copolymers of the non-tertiary acrylate esters herein enumerated, and copolymers of such esters with small amounts of other esters such as the 0–5% of n-propyl acrylate in the above example, or of other copolymerizable monomers as hereinafter noted, are effective in making reactive tackifiers. Copolymerization of these acrylate monomers or mixtures of monomers with small amounts of acrylic acid or equivalent copolymerizable additive monomer component results in normally tacky reactive polymers useful as tackifiers.

EXAMPLE 15

2-ethylbutyl acrylate and ethyl acrylate, copolymerized in 3:1 molar ratio to provide an average alcohol alkyl group of 5 carbon atoms, form a normally tacky and pressure-sensitive adhesive polymer which adheres to many surfaces. The same monomers when copolymerized in the same proportions but with small added amounts of acrylic acid provide a pressure-sensitive adhesive polymer. Amounts of acrylic acid ranging from about 4% to about 8% of the total monomers are found to provide the best overall results.

EXAMPLE 16

2-ethylbutyl acrylate and ethyl acrylate in a 3:1 molar ratio to which has been added from 4% by weight to 8% by weight of acrylic acid to provide a monomer mixture is copolymerized in accordance with the procedure set forth in Example 13. The resulting polymer may be isolated from the solution in which it is polymerized by conventional techniques and utilized as a reactive tackifier in accordance herewith.

EXAMPLE 17

A mixture of 104 parts by weight of distilled water, 8 parts of a 28% solution of alkylated aryl polyether sodium sulfonate ("Triton X–200"), 95.5 parts of isooctyl acrylate, 4.5 parts of acrylic acid, and 0.08 part of tertiary dodecyl mercaptan is purged well with nitrogen and brought to 30° C. with agitation. There is then added 0.2 part of potassium persulfate and 0.067 part of sodium bisulfite. Polymerization proceeds rapidly with evolution of heat. The polymer is recovered from the emulsion and dried. It is diluted with methyl ethyl ketone or heptane to 50% solids for use.

EXAMPLE 18

A mixture of 150 parts by weight of ethyl acetate, 96 parts of isooctyl acrylate, 4 parts of acrylamide, and 0.37 part of benzoyl peroxide is purged well with nitrogen and brought to 55° C. with agitation. Polymerization starts after about one hour and the batch gradually thickens. An additional 0.25 part of benzoyl peroxide is added at 3–4 hours and a like quantity at 7–8 hours. Heating is continued for a further 6 hours. The mixture may then be diluted with heptane to a coatable viscosity.

EXAMPLE 19

A mixture of 122 parts by weight of ethyl acetate, 95.3 parts of isooctyl acrylate, 1.4 parts of methacrylic acid, and 0.34 part of benzoyl peroxide is purged with nitrogen and brought to 55° C. with agitation. Polymerization starts after about one hour, and the solution gradually increases in viscosity. During the following five hours there is added, in approximately equal fractional portions, a total of 3.3 parts of methacrylic acid, 6.5 parts of ethyl acetate, and 0.59 part of benzoyl peroxide. The mixture is then thinned with a further 39 parts of ethyl acetate, held at 55–57° C. for seven hours, and diluted with heptane to a usable viscosity.

EXAMPLE 20

A reaction vessel is charged with 147 parts of distilled water, 2 parts of a 46% solution of alkyl aryl sodium sulfonate wetting agent, 94 parts of isooctyl acrylate, 6 parts of acrylonitrile, and 0.02 part of tertiary dodecyl mercaptan. After purging with nitrogen and bringing to 40° C., there are added 0.2 part of potassium persulfate and 0.067 part of sodium bisulfite. The resulting polymer is recovered in heptane solution, the water being removed by boiling in the continued presence of the heptane.

EXAMPLE 21

A copolymer of 97 parts by weight of isooctyl acrylate and 3 parts of methacrylamide is prepared in ethyl acetate solution by the method described in connection with Example 18.

It will be seen from the foregoing examples that either solution-polymerization techniques or emulsion techniques may be employed to reduce the reactive tackifier resins useful in this invention. Those skilled in the art may produce a wide variety of resins in accordance with the teachings of the foregoing examples, and reference may be had to Pat. 2,884,126, the disclosure of which is incorporated herein by reference, for further specific examples and details for the production of reactive tackifiers.

LATENT CURING AGENT

A further essential ingredient is a latent curing agent. This material is present in a relatively small amount which is sufficient to cure or to promote the curing of the epoxy resin. While the exact mechanism of its coaction in the system at elevated temperatures is not known, at temperatures above 145° C. to 165° C. these materials become active and promote the curing of the epoxy resin and seem also to promote the interaction of the epoxy resin with the film-forming ingredient and the tackifying resin. So far as has been determined, the latent curing agent itself becomes a part of the final cured resin as, for example, through cross-linking of the epoxy resin. Generally, from .5 to 5 parts by weight per 100 parts of total resin, or solids, in the adhesive composition is sufficient to effect the desired conversion.

Specific examples of latent curing agents useful in accordance with this invention are the nonresinous amides which contain reactive amine groups. A principal example of nonresinous amide-amine class materials is dicyanidiamide. This material decomposes at 145° to 165° C. to give rapid cures of epoxy resins. Another class of materials are boron trifluoride complexes with various amines containing from 4 to 10 carbon atoms. Specific examples include the boron trifluoride complexes with pyridine, piperidine, diethylaniline, monoethylamine. Another class of latent curing agents comprises the amine borates such as trimethanolamine borate or triethanolamine borate. The preferred latent curing agent is dicyanidiamide.

In the presence of such a material at the elevated temperature, the activity of the reactive tackifier resin appears also to be enhanced so that it too is available under these conditions for cross-linking reaction with the epoxy resin. Still further, the carboxyl groups contained in the film-forming material at the elevated temperatures and in the presence of other ingredients now also appear to interact with the epoxy material and possibly with latent curing material. The result of this mutual interreactivity of the several essential ingredients of these compositions is a very powerful structural adhesive composition. Accordingly, these compositions demonstrate pressure-sensitive properties at ordinary temperatures, and then upon elevation of the temperature above about 175° C., the entire mass specifies a mutual interreaction of the components such that each contributes to the final structural adhesive strength of the material.

The following table provides specific examples of adhesive compositions useful in accordance herewith:

TABLE I
[Parts by weight dry solids.]

| Components | 22 | 23 | 24 | 25 | 26 | 27 | 28 | 29 | 30 | 31 | 32 | 33 | 34 | 35 |
|---|---|---|---|---|---|---|---|---|---|---|---|---|---|---|
| Film-forming component: | | | | | | | | | | | | | | |
| Example 1 | | | 45 | 45 | | | | | 45 | 45 | | | | |
| Example 6 | 45 | 45 | | | | | | | | | | | | |
| Example 8 | | | | | | | | | | | | 45 | 45 | 45 |
| Example 9b | | | | | | 45 | | 45 | 45 | | 45 | | | |
| Polyamide (with free —NH₂ groups) | | | | | | | 50 | | | | | | | |
| Polyhydric phenol polyether alcohol comp.: | | | | | | | | | | | | | | |
| Example 11 | | | 50 | | | 60 | | | | | | | | |
| Example 12 | | | | 50 | 50 | | 50 | 70 | | 50 | | 50 | | 25 |
| Epoxidized Novolac ¹ | 70 | 50 | | | | | | | 50 | | 50 | | 50 | |
| Reactive tackifier component: | | | | | | | | | | | | | | |
| Example 13 (30% solids) | | | | | 50 | | | | 25 | 25 | 25 | | | |
| Example 17 (50% solids) | 25 | 25 | 50 | | 50 | 25 | 25 | 25 | | | | 25 | 25 | 50 |
| Latent curing agent: | | | | | | | | | | | | | | |
| Dicyandiamide (in MeOH) | | | 4.5 | 4.5 | 4.5 | 4.5 | | 4.5 | 6.3 | | 4.5 | 4.5 | 4.5 | 4.5 |
| BF₃—monoethylamine | | 6.3 | | | | | | | | 4.5 | | | | |
| Polyethyleneimine | | | | | | | | 3.0 | | | 4.5 | | | |
| Solvent medium: | | | | | | | | | | | | | | |
| Low M.W. alcohol: Methanol | | | 110 | 110 | 110 | 110 | | 110 | 150 | | | 110 | 110 | 110 |
| Low M.W. ketone: Methylethyl ketone | 180 | 180 | 180 | 180 | 180 | 200 | 180 | 180 | 180 | 180 | 180 | 180 | 180 | 180 |
| Glycol monoether: Methyl Cellosolve | | | | | | | 50 | | | | 50 | | | |

¹ See British Pat. 746,824 [1956].

In general, the adhesive compositions of the present invention which are thermally convertible to a structural adhesive contain the foregoing essential ingredients in the following proportions:

|  | Pbw. |
|---|---|
| Carboxylated elastomer | 25–65 |
| Epoxy resin | 30–200 |
| Reactive tackifier resin | 1–60 |
| Latent curing agent | 1–20 |

To prepare the compositions of this invention, a rubber cement is made from the elastomer by dissolving the material in any suitable solvent such as methyl ethyl ketone. The solids content may vary from 40% to 90% in the rubber cement. Thereafter, the epoxy resin is dissolved in the foregoing rubber cement. Next, the tackifier resin is dissolved in the foregoing solution. This provides solution A. Solution B is prepared by dispersing the latent curing agent in a suitable dispersing medium such as methyl or ethyl alcohol. For example, a dispersion of dicyandiamide in methyl alcohol to the extent of 4%–5% solids is prepared. This dispersion is then added slowly with stirring to solution A to produce a dispersion of solution B in solution A. A mutual solvent may be employed if desired to improve the dispersibility of solution B in solution A. Such a material is methyl cellosolve. This material has the drawback of being somewhat slow in the evaporation of the solvent from the adhesive composition.

The resultant solution-dispersions have a shelf-life of at least about 6 months. When cast as the film and the solvent or solvents are removed to produce the adhesive, the stability is at least about 3 months and may be as long as 6 to 12 months.

The combination of solutions A and B, hereinafter called solution C, is coated onto one side of a strippable substrate or backing paper having a release agent coated thereon. Conventional means for applying the adhesive as a coating may be employed, such as a doctor blade or a 2-roll reverse with a pattern bar. This composite is then dried in an oven at a temperature of about 75° C. (170° F.) to remove the solvent from the film. The residence time at this temperature is relatively short, that is on the order of about 2 to 3 minutes. A differentially releasible strippable substrate is then applied over the coating to form a sandwich such as shown in FIG. 1 with the adhesive composition of the present invention in the uncured, pressure-sensitive state disposed between the releasible webs.

In actual use, the adhesive sandwich is stripped of the most readily released webbing material and the exposed adhesive surface applied and pressed onto the surface of a member to be joined to another. Then, the differentially more difficultly releasible web material is stripped from the opposite surface of the adhesive film. A like procedure may be followed in applying adhesive film to the other member, or the other member may simply receive the first adhesive film when joined. The two members are joined with sufficiently firm pressure or light pressure to establish enough adhesion to permit handling. Thereafter, the composite may be handled during further assembly, for example, and finally is heated in accordance with a curing schedule which is again a time-temperature relationship.

The systems described herein will generally cure to a structural adhesive in 5 minutes at 400° F. or 30 minutes at 300° F. The bond strengths obtained with the systems of the present invention are remarkable for a pressure-sensitive structurally adhesive composition. Lap shear pull strengths in the range of from 500 to 3,000 p.s.i. as determined by the A.S.T.M. D–1002 tensile lap shear test have been obtained with compositions in the present invention. The product is most conveniently utilized in tape form of the double-face type. These compositions may also include other ingredients which will not interfere with the structural adhesion obtainable such as, for example, pigments, fillers, and crush-improving agents such as aluminum flake. The adhesive film is generally utilized as a 2-mil film.

The preparation of double-face tapes is well known to those skilled in the art. Release agents, and especially differentially strippable release agents, are known to those skilled in the art and may be used to coat the protective webs.

There has thus been provided a unique adhesive bonding film which has the initial properties of a pressure-sensitive adhesive but is thermosetting upon being heat activated. Lap shear bond strengths well in excess of 1500 p.s.i. are provided. One construction consists of a uniform .002 inch adhesive film carried on a protective paper liner. It is designed for structural bonding applications on aluminum, steel, wood, plastics, foamed plastics, epoxy surfaces, glass and glass fabrics.

In application, these adhesives are applied simply by pressing the adhesive film in place and removing the protective liner. The advantages of providing the adhesive in film form include accurate control of the glue line thickness, as opposed to lack of control characteristic of brush applications. Secondly, the adhesive film is always ready for use, and eliminates the problem of pot life characteristic of conventional liquid thermosetting adhesives. In addition, the fact that the adhesive is pressure-sensitive when applied permits pre-positioning of components on the assembly line, since it possesses sufficient tack to hold parts in place before being cured by application of heat. This minimizes the need for clamps or other holding devices during assembly. While external pressure is not a necessary factor during the thermosetting reaction, moderate pressure is suggested to insure good contact between the surfaces being bonded. The amount of pressure depends largely upon the configuration of articles being bonded.

Before heat activation, the pressure-sensitive properties in preferred embodiments include 180° peel adhesion in excess of 30 ounces per inch of width and static holding power in excess of 435 minutes when applied to stainless steel for 24 hours and tested in accordance with PSTC Test Methods #1 and #7 respectively. When heat cured at a temperature of 400° F. for 5 minutes, bonds in excess of 1500 p.s.i. lap shear are developed as measured in accordance with A.S.T.M. D–1002. Lower cure temperatures are possible with longer dwell time. The high strength and good flexibility of the cured adhesive are maintained over a service temperature range of −50° to 250° F. The adhesive resists weather, moisture, most common petroleum-based oils and greases, aromatic and aliphatic solvents.

What is claimed is:
1. A pressure-sensitive adhesive composition thermally convertible to a structural adhesive including in combination:
 (a) from 25 to 65 parts by weight of a film-forming carboxylated elastomeric diene polymer material formed from a polymerizable mixture of monomers including an open-chain aliphatic conjugated diene containing from 4 to 9 carbon atoms and an olefinically unsaturated carboxylic acid containing from 3 to 18 carbon atoms and containing from 0.001 to 0.30 chemical equivalents of combined carboxyl group per 100 parts by weight of the polymer;
 (b) from 30 to 200 parts by weight of a normally liquid polyglycidyl ether of a polyhydric phenol having an epoxide equivalent weight of from 175 to 300 and an average molecular weight of from 300 to 700;
 (c) from 1 to 60 parts by weight of a tackifier resin reactive in the system at temperatures above 140° C. and substantially unreactive therewith at temperatures below about 75° C., said tackifier being a copolymer of (A) a $C_1$ to $C_{12}$ alkanol ester of a low molecular weight $C_3$ to $C_5$ monoethylenically unsaturated monocarboxylic acid and (B) from 3% to 10% by weight of the tackifier copolymer of (1) a monomeric $C_3$ to $C_5$ monoethylenically unsaturated monocarboxylic acid, or (2) a monomeric $C_3$ to $C_5$ monoethylenically unsaturated amide, or (3) a monomeric $C_3$ to $C_5$ monoethylenically unsaturated nitrile, or (4) mixtures thereof;
 (d) from 1 to 20 parts by weight of a latent curing agent for said polyglycidyl ether of a polyhydric phenol active at temperatures above about 140° C. selected from dicyandiamide, a boron trifluoride-amine complex, or an amine borate, or polyethylene imine.

2. An adhesive composition in accordance with claim 1 wherein the elastomeric diene polymer is a terpolymer.

3. An adhesive composition in accordance with claim 1 wherein the elastomeric diene polymer (a) is a terpolymer formed from a polymerizable mixture of monomers including an open-chain aliphatic conjugated diene containing from 4 to 9 carbon atoms, an olefinically unsaturated carboxylic acid containing from 3 to 18 carbon atoms and containing from 0.001 to 0.30 chemical equivalents of combined carboxylic group per 100 parts by weight of the polymer, and an interpolymerizable monoethylenically unsaturated material containing from 3 to 14 carbon atoms.

4. An adhesive composition in accordance with claim 1 in which the conjugated diene is butadiene-1,3.

5. An adhesive composition in accordance with claim 1 in which the carboxylic acid in component (a) is methacrylic acid.

6. An adhesive composition in accordance with claim 1 in which the carboxylic acid in component (a) is acrylic acid.

7. An adhesive composition in accordance with claim 3 in which the interpolymerizable monoolefinic material in component (a) is acrylonitrlie.

8. An adhesive composition in accordance with claim 3 in which the conjugated diene is butadiene-1,3; the unsaturated carboxylic acid is methacrylic acid; and the monoethylenically unsaturated material is acrylonitrile.

9. An adhesive composition in accordance with claim 1 in which the unsaturated alkanol ester of component (c) is isooctyl acrylate.

10. An adhesive composition in accordance with claim 1 in which the unsaturated monomer (B) in component (c) is monoethylenically unsaturated monocarboxylic acid containing from 3 to 5 carbon atoms.

11. An adhesive composition in accordance with claim 1 in which the unsaturated monomer (B) in component (c) is an amide of monoethylenically unsaturated monocarboxylic acid containing from 3 to 5 carbon atoms.

12. An adhesive composition in accordance with claim 10 in which the monocarboxylic acid is acrylic acid.

13. An adhesive composition in accordance with claim 1 in which the unsaturated monomer (B) in component (c) is a $C_3$–$C_5$ monoethylenically unsaturated nitrile.

14. An adhesive composition in accordance with claim 13 in which the nitrile is acrylonitrile.

15. An adhesive composition in accordance with claim 1 in which the tackifier resin (c) is a copolymer of isooctyl acrylate and acrylic acid.

16. An adhesive composition in accordance with claim 1 in which the tackifier resin (c) is a copolymer of methyl methacrylate and acrylic acid.

17. An adhesive composition in accordance with claim 1 in which the latent curing agent is dicyandiamide.

18. An adhesive composition in accordance with claim 1 in which the latent curing agent is a boron trifluoride complex with an organic amine containing from 4 to 10 carbon atoms.

19. An adhesive composition in accordance with claim 1 in which the latent curing agent is an amine borate.

20. An adhesive composition in accordance with claim 19 in which the amine borate is triethanolamine borate.

21. An adhesive composition in accordance with claim 1 in which:
(a) the elastomeric diene polymer is a terpolymer of butadiene-1,3, methacrylic acid, and the monoolefinic material is acrylonitrile;
(b) the epoxy resin is a polyhydric phenol polyether alcohol having an epoxy equivalent weight of from 225 to 290 and an average molecular weight of about 450;
(c) the tackifier resin is a copolymer of a low molecular weight non-tertiary alcohol ester of acrylic acid, and acrylic acid in a weight ratio of about 95:5, respectively; and
(d) dicyandiamide in an amount sufficient to cure component (b).

22. In a pressure-sensitive adhesive composition including from 25 to 65 parts by weight of a film-forming carboxylated elastomeric diene material formed from a polymerizable mixture of monomer including an open-chain aliphatic conjugated diene containing from 4 to 9 carbon atoms and an olefinically unsaturated carboxylic acid containing from 3 to 18 carbon atoms and containing from 0.001 to 0.30 chemical equivalents of combined carboxyl group per 100 parts by weight of the polymer, from 30 to 200 parts by weight of a normally liquid polyglycidyl ether of a polyhydric phenol having an epoxide equivalent weight of from 175 to 300 and an average molecular weight of from 300 to 700 reactive with said elastomer and from 1 to 20 parts by weight of a latent curing agent for said polyglycidyl ether of a polyhydric phenol active at temperatures above about 140° C. selected from dicyandiamide, a boron trifluorideamine complex, or an amine borate, or polyethylene imine, the improvement which comprises incorporating therein a resinous tackifier reactive with either one or both of the elastomer and the epoxy resin at temperatures above about 140° C., and substantially unreactive in the system at temperatures below about 75° C. whereby said adhesive is thermally convertible to a structural adhesive, said tackifier being a copolymer of (A) a $C_1$ to $C_{12}$ alkanol ester of a low molecular weight $C_3$ to $C_5$ monoethylenically unsaturated monocarboxylic acid and (B) from 3% to 10% by weight of the tackifier copolymer of (1) a monomeric $C_3$ to $C_5$ monoethylenically unsaturated monocarboxylic acid, or (2) a monomeric $C_3$ to $C_5$ monoethylenically unsaturated amide, or (3) a monomeric $C_3$ to $C_5$ monoethylenically unsaturated nitrile, or (4) mixtures thereof.

23. An improved pressure-sensitive adhesive composition in accordance with claim 22 in which the unsaturated ester of the tackifier copolymer is isooctyl acrylate.

24. An improved pressure-sensitive adhesive composition in accordance with claim 22 in which the monoethylenically unsaturated monocarboxylic acid component of the tackifier resin is acrylic acid.

25. An improved pressure-sensitive adhesive composition in accordance with claim 22 in which the tackifier resin is a copolymer of isooctyl acrylate and acrylic acid in a weight ratio of 95:5.

References Cited

UNITED STATES PATENTS

| | | | |
|---|---|---|---|
| 2,947,338 | 8/1960 | Reid | 260—837 |
| 3,312,754 | 4/1967 | Marks | 260—837 |
| 3,324,198 | 6/1967 | Gruver | 260—836 |
| 3,444,121 | 5/1969 | Altier | 260—836 |
| 3,484,338 | 12/1969 | Britton | 260—836 |

PAUL LIEBERMAN, Primary Examiner

U.S. Cl. X.R.

260—23.7 N, 23.7 R, 28.5 A, 28.5 B, 80.8, 86.1 R, 836; 161—184, 185, 186